United States Patent [19]

Nakamura et al.

[11] Patent Number: 4,985,616
[45] Date of Patent: Jan. 15, 1991

[54] OPTICAL CARD HAVING OPTICAL GROOVES FOR ACCESS AND WOBBLED MARKS FOR TRACKING AND A RECORDING-REPRODUCING APPARATUS THEREFOR

[75] Inventors: Shigeru Nakamura, Tachikawa; Yoshito Tsunoda, Suginami; Takeshi Maeda, Kokubunji, all of Japan

[73] Assignee: Hitachi, Ltd., Tokyo, Japan

[21] Appl. No.: 153,003

[22] Filed: Feb. 8, 1988

[30] Foreign Application Priority Data

Feb. 25, 1987 [JP] Japan ................... 62-40226

[51] Int. Cl.⁵ ................ G11B 7/007; G06K 7/01
[52] U.S. Cl. .................... 235/494; 235/487; 235/454; 369/44.26; 369/275.3; 369/44.13
[58] Field of Search ............ 369/275, 105, 59, 44, 369/46, 93, 277–279, 275.3, 44.26, 44.13; 346/76 L; 235/454, 456, 487, 488, 494

[56] References Cited

U.S. PATENT DOCUMENTS

| 3,919,697 | 11/1975 | Walker | 369/44 |
| 4,364,118 | 12/1982 | Maeda et al. | 369/44 |
| 4,428,075 | 1/1984 | Hazel et al. | 369/275 |
| 4,534,031 | 8/1985 | Jewer | 369/93 |
| 4,562,564 | 12/1985 | Bricot et al. | 369/44 |
| 4,598,393 | 7/1986 | Pierce et al. | 369/46 |
| 4,730,293 | 3/1988 | Pierce et al. | 235/454 |
| 4,748,609 | 5/1988 | Yonezawa et al. | 369/44 |
| 4,787,075 | 11/1988 | Matsuoka et al. | 369/279 |

FOREIGN PATENT DOCUMENTS 61-82286  4/1986  Japan .

Primary Examiner—Stuart S. Levy
Assistant Examiner—Robert Weinhardt
Attorney, Agent, or Firm—Antonelli, Terry, Stout & Kraus

[57] ABSTRACT

An optical card of the present invention has a card-shaped recording layer whose optical characteristic is varied by a laser beam applied thereon, and a resin layer for protecting this recording layer. The recording layer has optical grooves provided at a substantially equal interval in the opposite end portions of the recording layer respectively and varying the light intensity of the laser beam when the beam traverses the grooves, and first and second optical markers provided at a prescribed interval in the direction of extension of each of the optical grooves and varying the light intensity of the laser beam which passes them. The optical grooves are made longer every prescribed number thereof than others, and the longer optical grooves are used for zone access, while the shorter optical grooves are used for track access in a zone. The first and second optical markers are provided at positions deviated alternately at equal distance from the center of a track, and operate as so-called wobble pits to detect a track error. These markers are used also as timing marks for generating a clock signal.

16 Claims, 2 Drawing Sheets

OPTICAL CARD HAVING OPTICAL GROOVES FOR ACCESS AND WOBBLED MARKS FOR TRACKING AND A RECORDING-REPRODUCING APPARATUS THEREFOR

BACKGROUND OF THE INVENTION

The present invention relates to an optical card enabling the optical recording and reproduction of information by the application of laser beams on the information recording surface thereof and to a recording-reproducing apparatus therefor.

With the popularization of a magnetic card and an IC card, an increased interest has been shown in an optical card having a larger capacity than these cards, and various optical cards and apparatuses therefor have been proposed For instance, a read-only optical card and an apparatus therefor are mentioned in the Collection of papers of '85 optical memory symposium. In this apparatus, a light from a light source is applied on an information recording surface, and the information recording surface is imaged on the surface of a CCD line sensor so as to reproduce information. In this kind of reproduction-only apparatus, a light can be applied on a wide information recording area in the direction vertical to the direction of movement of the optical card. This apparatus, therefore, has merits that a precise tracking mechanism is dispensed with, that an optical head can be positioned, with mechanical precision, at the position of a gathering (zone) of a large number of tracks, and that a clock signal for timing for reading information needs to be recorded only in one track in the zone, etc.

SUMMARY OF THE INVENTION

In order to enable recording in an optical card apparatus, a laser beam flux needs to be focused as a minute spot on an information recording surface. For this purpose, it is necessary to provide a tracking servo system for positioning the minute spot accurately and a system for recognizing a track address, unlike the aforesaid reproduction-only optical card apparatus.

One object of the present invention is to furnish an optical card and a recording-reproducing apparatus therefor which enable the recognition of the track address without using any special address pits.

Another object of the present invention is to furnish an optical card and a recording-reproducing apparatus therefor which enables the access to a zone comprising many tracks.

A further object of the present invention is to furnish an optical card and a recording-reproducing apparatus therefor which enables precise tracking by means of a simple system and further enables the detection of a clock signal and a position of a track.

The optical card of the present invention is characterized in that optical reference markers are provided beforehand at positions located on the right and left sides of the center of a track alternately and spaced at equal distance therefrom, and in that optical reference grooves are also provided beforehand in the opposite ends of the track.

In the same way as in an optical disk, it can be supposed to form a track in the form of a projection or a groove on a recording surface and to record address pits in the form of bosses or pits in one end of the groove beforehand. While the optical disk rotates at a fixed speed, however, the optical card moves in reciprocation, and therefore the address pits can not be recorded effectively in a scanning section required for the feeding speed of the optical card to reach a prescribed rate. Moreover, data areas are lessened, since address pit areas are also necessitated. In place of the address pits, in the present invention, an optical reference groove or projection, for instance, is provided in the opposite ends of each track (an imaginary channel for recording data pits), and the passing of a light spot across these optical reference grooves is detected to recognize a track address whereat the light spot is positioned.

As for a method for detecting the deviation of a track, a diffraction push-pull method employed for the optical disk can be used. According to this method, however, a track offset tends to occur, because the optical card is warped or curved to a larger degree in employment than the optical disk. In the present invention, reference markers or wobble pits are provided at positions located on the right and left sides of the center of each track alternately and spaced at equal distance therefrom in a data recording area held between the optical reference grooves, and a light spot is moved along the track to detect a track error by using the light intensity change (or modulation) or reflective intensity change (or modulation) which is generated when the light spot passes said optical reference markers. As an example of using wobble pits for detecting a track error, there have been known U.S. Pat. No. 4,364,118.

DESCRIPTION OF THE PREFERRED EMBODIMENTS

Figure 1:
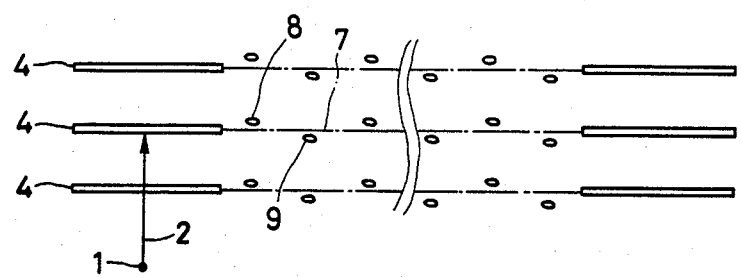
FIG. 1 is an illustration of examples of optical reference markers and optical reference grooves provided on a recording surface of an optical card of the present invention.
Figure 2:
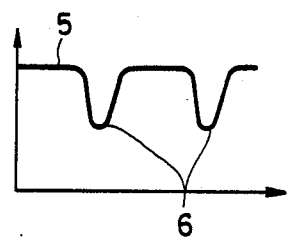
FIG. 2 is an illustration of a change in the quantity of reflected light obtained when a light spot passes across the optical reference grooves.
Figure 3A:
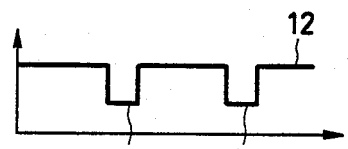
FIG. 3A is an illustration of a change in the reflective intensity obtained when the light spot moves along the center line of a track.
Figure 3B:
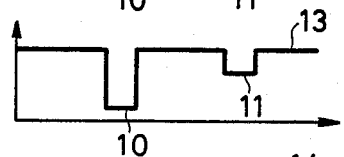
FIG. 3B is an illustration of the reflective intensity obtained when the light spot moves in deviation above the track.
Figure 3C:
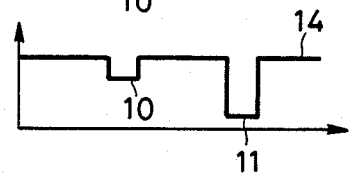
FIG. 3C is an illustration of a change in the reflective intensity obtained when the light spot moves in deviation below the track.

The principles of address recognition and tracking according to the present invention will be described by using FIG. 1, FIG. 2, FIG. 3A, FIG. 3B and FIG. 3C. In the opposite ends of each track 7, optical reference grooves 4 in an indented or projecting form are provided. Moreover, optical reference markers or wobble pits 8 and 9 are provided in an indented or projecting form, for instance, at positions located on the right and left sides of the center of each track 7 alternately and spaced at equal distance therefrom in a data recording area which is held between the optical reference grooves 4 provided in the opposite ends respectively. First, a light spot is positioned at the corner of the end portion of a track indicated by a point 1. Then, it is moved therefrom in the direction of an arrow 2 extending across the track and made to pass across the optical reference groove 4 provided in the end portion of each track. On the occasion the reflective intensity lessens every time when the light spot passes the optical reference groove 4 as indicated by a solid line 5 of FIG. 2. Accordingly, the number of passed tracks can be recognized by counting the number of valley portions 6 wherein said intensity is below a prescribed level, and thus a desired track can be reached. When the light spot is moved along the track, subsequently, the reflective intensity lessens when the spot passes the optical reference markers or wobble pits 8 and 9. The markers or pits 8 and 9 are spaced at equal distance in the reverse direction to each other from the center line of a track. When the spot moves on the center line of the track, therefore, the level 10 of the reflective intensity obtained when the spot passes the marker or pit 8 is equal to the level 11 thereof obtained when the spot passes the marker or pit 9, as indicated by a solid line 12 of FIG. 3A. When the spot moves in deviation above the center line 7 in the paper, however, the level 10 of the reflective intensity turns lower than the level 11 thereof as indicated by a solid line 13 of FIG. 3B. When the spot moves in deviation below the center line 7 in the paper, to the contrary, the level 10 turns higher than the level 11 as indicated by a solid line 14 of FIG. 3C. Accordingly, the amount of a track error and the direction thereof can be detected by comparing the level 10 with the level 11, and thereby a position of application of the light spot can be controlled so that it be always maintained on the center line 7 of a track. Data pits are recorded along the center line of the track between optical markers 8 and 9.

Figure 4A:
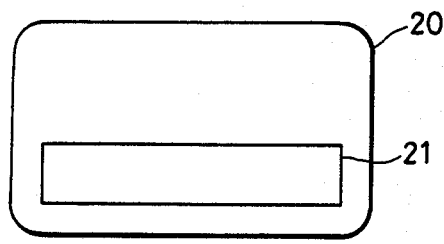
FIG. 4A is a schematic view of a construction of one example of an optical card of the present invention.
Figure 4B:
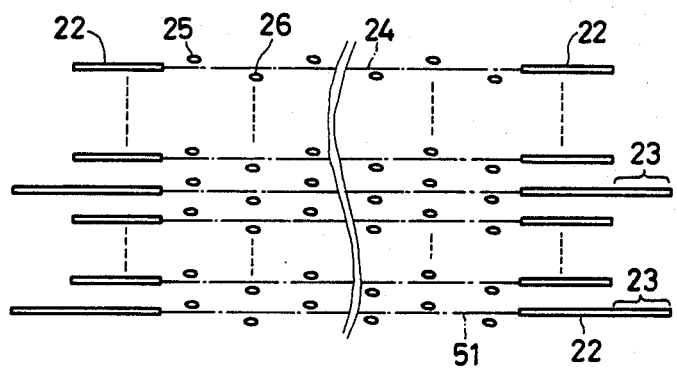
FIG. 4B is an illustration of examples of optical reference markers and optical reference grooves provided on the recording surface of said card.

Next, one embodiment of the present invention will be described with reference to FIG. 4A and FIG. 4B. An optical card 20 is made of polycarbonate resin of thickness 0.8 mm, for instance, and it has a recording area 21 provided with a recording layer or a recording medium of Sn-Te-Se which is covered on both sides with resin. The layer of resin functions also as a protective layer for the recording layer. In the recording area 21, optical reference grooves 22 having the depth of a ¼ wavelength are arranged in parallel at intervals of several microns on the recording layer, and extended groove portions 23 are provided every 16 grooves, for instance, as shown in FIG. 4B. Moreover, optical reference markers or wobble pits 25 and 26 are arranged at an equal interval of several ten micron meters, being deviated alternately from the center line 24 of a track in the direction reverse to each other at equal distance therefrom, and the pits 25 and 26 have the depth of a ¼ wavelength. The depth of the grooves and the pits is set to be a ¼ wavelength, because a change in a reflected light is maximum at this depth.

Figure 5:
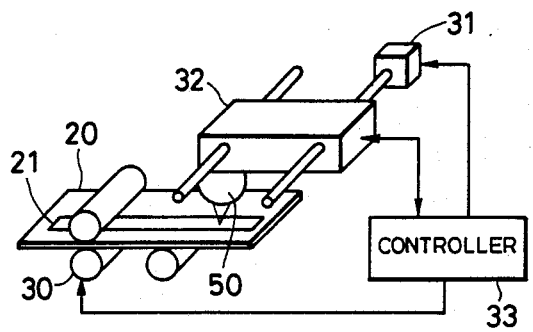
FIG. 5 is an illustration of a construction of one embodiment of an optical card recording-reproducing apparatus of the present invention.
Figure 6:
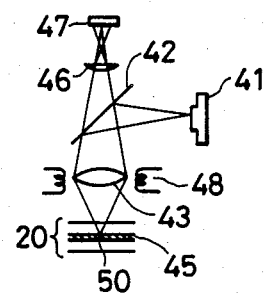
FIG. 6 is an illustration of an example of a construction of an optical head employed in the apparatus of FIG. 5.

FIG. 5 illustrates an apparatus which conducts recording and reproduction by using the optical card of the present invention In this apparatus, a card loader 30 conveys an optical card 20 in the longitudinal direction of the card, and a step motor 31 moves an optical head 32 in the direction perpendicular to the direction of the movement of the optical card 20. The driving of these elements and the recording and reproduction by the optical head 32 are inplemented through the intermediary of a controller 33. FIG. 6 shows an optical construction of the optical head 32, and a laser beam emitted from a semiconductor laser 41 is reflected by a half mirror 42 and focused as a spot 50 of several microns on a recording layer 45 of the optical card 20 by a focusing lens 43. A beam reflected from said layer is gathered again by the lens 43 and is passed through an astigmatism optical element such as a cylindrical lens 46, and a focus error signal and a reproduced information signal are obtained therefrom by a 4-divided photo-detector 47. The detection of these signals is described in detail in U.S. Pat. No. 4,293,944, for instance. Focusing and tracking are performed by moving the lens 43 in the direction of the optical axis of the lens and in the direction perpendicular to the track of the card by means of a two-dimensional actuator 48.

The optical card 20 is put in the apparatus by the card loader 30, and the extended groove portion 23 of the recording area 21 is moved to a place under the optical axis of the focusing lens 43. The optical head 32 is positioned beforehand on the outside of a first track 51. After a focusing control is started, the optical head 32 is fed by a step motor 31 and made to reach a desired information recording zone (zone access) while the number of passing amount of the extended groove portion 23 which a spot 50 traverses on is counted. Next, the conveyance of the optical card 20 by the card loader 30 is started, and since the speed of the movement of the card reaches a substantially fixed value while the spot 50 passes along the groove 22, the spot 50 moves on the center line of a track in a data recording area, recording data along the center line 24 of the track between the pits 25 and 26 or reproducing recorded data from the track. The art of these recording and reproduction can be attained by driving a semiconductor laser output in a pulsating manner in the case of recording, and by driving the laser by an optical output being too weak to effect recording in the case of reproduction. When the light spot 50 deviates from the center line 24 of the track, a track error signal is obtained on the basis of the above-described principles by using the pits 25 and 26, and the track error is corrected by the lens actuator 48. In more detail, an output (sum output) of the light detector 47 is sampled at the timings of the light spot 50 passing through the markers 25 and 26 respectively, and a tracking signal can be detected from the difference between the outputs sampled at the respective timings. The pits 25 and 26 can be used also to detect a clock signal for recording or reproduction, and this clock signal can be obtained by inputting the output (sum output) of the light detector 47 to a phase lock loop. Moreover, since the reflective intensity varies every time when the light spot 50 passes the pits 25 and 26, the position in the direction of the track can be detected by pulse-shaping the output of the light detector 47 and by counting pulses generated every time when the light spot 50 passes the pits 25 and 26. When the spot reaches a groove 22 provided in the opposite direction, it is made to jump into a groove on an adjacent track or to transfer onto a farther track, and the card 20 is moved in the opposite direction by the card loader 30 for a subsequent operation of recording or reproduction.

According to the present embodiment, the recognition of a track address can be realized without using any special address pits. Moreover, it enables the access to a zone comprising a large number of tracks, enabling the achievement of precise tracking by an apparatus of simple construction, and further enabling the detection of a clock signal and a track position.

What is claimed is:

1. An optical card which enables the optical recording and reproduction of information by the application of laser beams on an information recording surface, and in which said information recording surface has optical reference markers at positions located at a prescribed interval along a prescribed channel and deviated therefrom on the right and left sides alternately at equal distance and has optical reference grooves spaced from one another along a centerline of said channel, said optical reference grooves being disposed in the opposite ends of said channel.

2. An optical card according to claim 1, wherein said optical reference grooves are made longer every prescribed number thereof than others.

3. An optical card recording-reproducing system comprising an optical card which enables the optical recording and reproduction of information by the application of laser beams on an information recording surface, and in which said information recording surface has optical reference markers at positions located at a prescribed interval along a prescribed channel and deviated therefrom on the right and left sides alternately at equal distance and has optical reference grooves spaced from one another along a centerline of said channel, said optical reference grooves being disposed in the opposite ends of said channel, a first moving means for moving said optical card in the direction of said channel, an optical head for applying laser beams on the information recording surface of said optical card, and a second moving means to move said head in the direction perpendicular to said channel.

4. An optical card recording-reproducing apparatus according to claim 3, wherein said optical head comprises a laser light source, a lens for focusing a laser beam from said laser light source on said information recording surface, and a light detector receiving a beam reflected from said information recording surface.

5. An optical card which has a recording layer enabling the optical recording and reproduction of information, and wherein said recording layer has optical grooves spaced from one another along a line extending in the extension direction of the optical grooves and provided at a substantially equal interval in the opposite ends thereof, and first and second optical markers disposed adjacently along the line which connects the one optical groove with the another optical groove located in the opposite ends thereof.

6. An optical card according to claim 5, wherein said optical grooves are made longer every prescribed number thereof than others.

7. An optical card having a card-shaped recording layer whose optical characteristic is varied by a laser beam applied thereon, protective members protecting said recording layer by holding same therebetween, optical grooves provided at least in one end portion of said recording layer and varying the light intensity of said laser beam when the beam traverses them, said optical grooves being spaced from one another along a line extending in the direction of extension of said optical grooves and being provided in the opposite end portions of said recording layer, and first and second optical markers provided at a prescribed interval along the line in the direction of extension of each of said optical grooves and varying the light intensity of said laser beam.

8. An optical card according to claim 7, wherein said optical grooves are made longer every prescribed number thereof than others and employed for zone access of said laser beam.

9. An optical card recording-reproducing system comprising an optical card having a card-shaped recording layer whose optical characteristic is varied by a laser beam applied thereon, protective members protecting said recording layer by holding same therebetween, optical grooves provided at least in one end portion of said recording layer and varying the light intensity of said laser beam when the beam traverses them, said optical grooves being spaced from one another along a line extending in the direction of extension of said optical grooves and being provided in the opposite end portions of said recording layer, and first and second optical markers provided at a prescribed interval along the line in the direction of extension of each of said optical grooves and varying the light intensity of said laser beam, a first moving means for moving said optical card in the direction of extension of said optical grooves, an optical head for applying a laser beam on said recording layer, and a second moving means to move said optical head in the direction of traversing said optical grooves, and wherein said optical head has a position control system for controlling the position of application of said laser beam in the direction traversing said optical grooves.

10. An optical card recording-reproducing apparatus according to claim 9, wherein said optical markers are used for obtaining a timing for generating a clock signal.

11. An optical card comprising:
a card-shaped substrate;
a card-shaped recording layer provided on the substrate;
first and second access areas arranged in opposite ends of the recording layer, each of the first and second access areas having preformed, optically detectable grooves extending on and spaced from one another along center lines of a plurality of parallel tracks, each groove being spaced from an adjacent groove of a parallel track by a predetermined distance and varying the intensity of a radiation beam when the radiation beam traverses the groove such that the passing of the radiation beam across the groove is detected to recognize a track address whereat the radiation beam is positioned; and
a recording area arranged between the first and second access areas, the recording area having a plurality of preformed, optically detectable first and second markers provided alternately at a prescribed interval along the respective track and deviated from the respective centerline of the respective track on the right and left sides alternately at equal distance such that the first and second markers vary the intensity of the radiation beam when the radiation beam passes the first and second markers along the track and operate as wobbled tracking pits for detecting a track error, the intervals being designated as recording regions for recording data.

12. An optical card according to claim 11, wherein the grooves are made longer every prescribed number of the grooves than others of the grooves, and the longer grooves are employed for zone access.

13. An optical card according to claim 11, wherein the first and second markers are used for obtaining a timing for generating a clock signal.

14. An optical card for storing data in an optically detectable form, comprising first and second access areas arranged in opposite ends of the card, each of the first and second access areas having preformed, optically detectable grooves extending on and spaced from one another along centerlines of a plurality of parallel tracks, each groove being spaced from an adjacent groove of a parallel track by a predetermined distance and varying the intensity of a radiation beam when the radiation beam traverses the groove such that the passing of the radiation beam across the groove is detected, and a recording area arranged between the first and second access areas, the recording area having a plurality of preformed, optically detectable first and second markers provided alternately at a prescribed interval along the respective track and deviated from the respective centerline of the respective track on the right and left sides alternately at equal distance such that the first and second markers vary the intensity of the radiation beam when the radiation beam passes the first and second markers along the track and operate as wobbled tracking pits for detecting a track error, the intervals being designated as recording regions for recording data.

15. An optical card according to claim 14, wherein the grooves are made longer every prescribed number of the grooves than others of the grooves, and the longer grooves are employed for zone access.

16. An optical card according to claim 14, wherein the first and second markers are used for obtaining a timing for generating a clock signal.

* * * * *